United States Patent
DiDonato

(10) Patent No.: US 7,455,034 B2
(45) Date of Patent: *Nov. 25, 2008

(54) NO-TANGLE TWO DOG RETRACTABLE LEASH WITH ROTATABLE HANDLE

(76) Inventor: Pietro DiDonato, 212 Bement Ave., Staten Island, NY (US) 10310

( * ) Notice: Subject to any disclaimer, the term of this patent is extended or adjusted under 35 U.S.C. 154(b) by 0 days.

This patent is subject to a terminal disclaimer.

(21) Appl. No.: 11/855,382

(22) Filed: Sep. 14, 2007

(65) Prior Publication Data

US 2008/0000433 A1 Jan. 3, 2008

Related U.S. Application Data

(63) Continuation of application No. PCT/US2006/009158, filed on Mar. 14, 2006, which is a continuation-in-part of application No. 10/906,971, filed on Mar. 14, 2005, now abandoned.

(51) Int. Cl.
*A01K 27/00* (2006.01)
*B65H 75/34* (2006.01)

(52) U.S. Cl. .................... 119/796; 119/794; 242/381.3

(58) Field of Classification Search ......... 119/794–796; 242/381, 381.3, 385.4, 377, 381.2
See application file for complete search history.

(56) References Cited

U.S. PATENT DOCUMENTS 2,106,053 A 1/1938 Laingor
2,222,409 A 11/1940 Gottlieb 3,693,596 A * 9/1972 Croce et al. ............... 119/796

(Continued)

OTHER PUBLICATIONS

International Preliminary Report on Patentability issued Jun. 28, 2006.

*Primary Examiner*—Michael R. Mansen
*Assistant Examiner*—Joshua J Michener
(74) *Attorney, Agent, or Firm*—Ostrolenk, Faber, Gerb & Soffen, LLP

(57) ABSTRACT

Disclosed is a two-pet no-tangle retractable leash device including an axle having a rod opening and a first spool including a first leash and a second spool including a second leash rotatably mounted on the axle. Each leash has a proximal end attached to the spool and a distal end extending through one of two leash openings. Additionally, each spool has a spool brake element and a return spring, where a proximal end of the return spring is connected to the spool and a distal end of the return spring is connected to the axle. When a force is applied to pull on the leashes, the spools rotate thereby unwinding the return springs. When the force is removed, the return springs rewind forcing the spool to rewind the leash to its original position. The device further includes a shaft having a proximal end and a distal end, a brake rod having a distal end passing through the rod opening and the proximal end passing through the shaft; a brake connected to the distal end of the brake rod; and a brake spring positioned on the brake rod between the brake and the axle, wherein the shaft rotation around the shaft axis and the spools' rotation around the axle axis is enabled when the brake is not engaged and disabled when the brake is engaged. A housing has a lock for lockably engaging a respective spool. A handle is attached to a proximal end of the shaft and a cowling portion covers an area between the handle and the housing.

21 Claims, 4 Drawing Sheets

U.S. PATENT DOCUMENTS

| | | | |
|---|---|---|---|
| 3,853,283 A | 12/1974 | Croce et al. | |
| 4,195,795 A * | 4/1980 | Ardizio | 242/378.4 |
| 4,428,542 A | 1/1984 | Kobayashi et al. | |
| 4,501,230 A * | 2/1985 | Talo | 119/796 |
| 4,765,557 A * | 8/1988 | Kahmann | 242/381.6 |
| 5,377,626 A | 1/1995 | Kilsby et al. | |
| 5,489,010 A | 2/1996 | Rogers | |
| 5,701,981 A * | 12/1997 | Marshall et al. | 191/12.4 |
| 5,709,350 A | 1/1998 | Davis et al. | |
| 5,762,029 A | 6/1998 | DuBois et al. | |
| 5,887,550 A | 3/1999 | Levine et al. | |
| 5,906,329 A | 5/1999 | Wesley, Sr. | |
| 6,003,472 A | 12/1999 | Matt et al. | |
| 6,024,054 A * | 2/2000 | Matt et al. | 119/796 |
| 6,148,773 A | 11/2000 | Bogdahn | |
| 6,250,578 B1 * | 6/2001 | Manda | 242/378.1 |
| 6,273,029 B1 | 8/2001 | Gish | |
| 6,474,270 B1 | 11/2002 | Imes | |
| 6,626,132 B1 | 9/2003 | Mann | |
| 6,792,893 B1 * | 9/2004 | Quintero et al. | 119/796 |
| 6,886,499 B2 * | 5/2005 | Meissner | 119/796 |
| 6,955,138 B2 | 10/2005 | DeBein | |
| 6,957,929 B1 * | 10/2005 | Rachel et al. | 405/158 |
| 7,036,459 B1 * | 5/2006 | Mugford et al. | 119/796 |
| 7,207,296 B2 | 4/2007 | DiDonato | |
| 2004/0154556 A1 * | 8/2004 | Masterson et al. | 119/794 |
| 2005/0172914 A1 * | 8/2005 | Woodruff | 119/796 |
| 2007/0022975 A1 * | 2/2007 | Arnold | 119/796 |

* cited by examiner

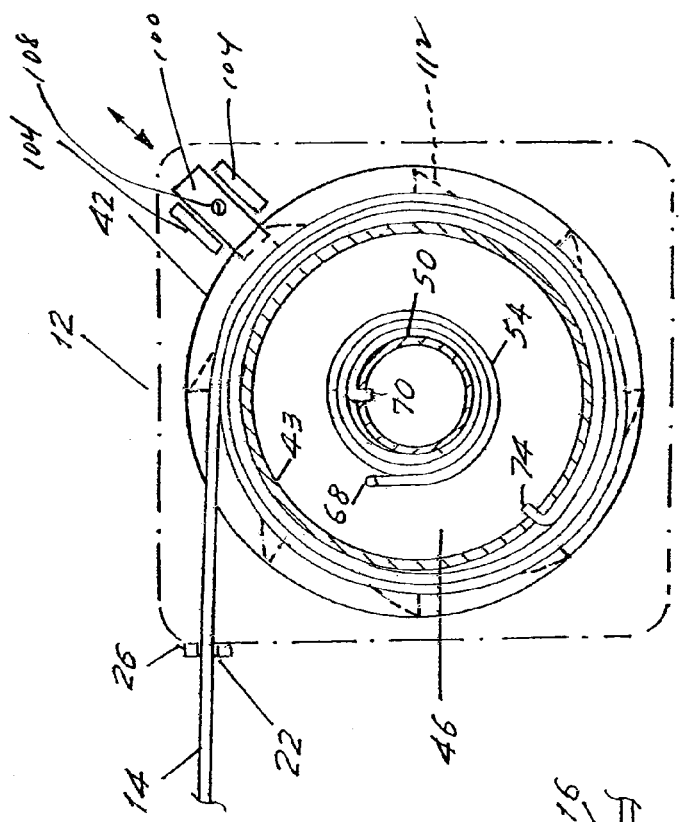
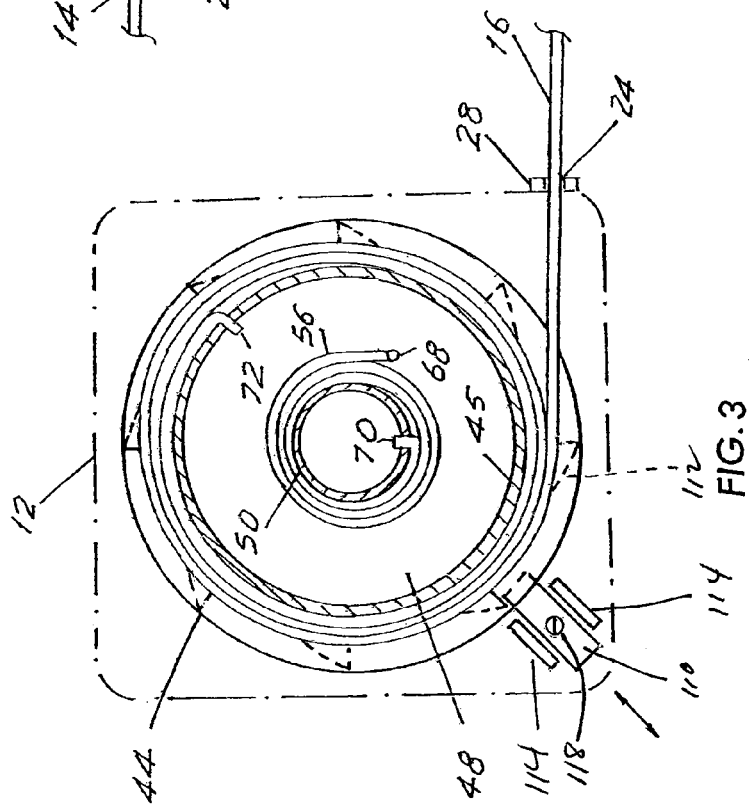
FIG. 3
FIG. 4

NO-TANGLE TWO DOG RETRACTABLE LEASH WITH ROTATABLE HANDLE

CROSS-REFERENCE TO RELATED APPLICATION

This is a continuation under 35 U.S.C. §111(a) of PCT/US2006/009158 filed Mar. 14, 2006, incorporated by reference. PCT/US2006/009158 is a continuation-in-part of U.S. non-provisional application Ser. No. 10/906,971, filed Mar. 14, 2005 now abandoned in the name of Pietro DiDonato and entitled "NO-TANGLE TWO DOG RETRACTABLE LEASH WITH FLASHLIGHT," and corresponds to U.S. Pat. No. 7,207,296 issued Apr. 24, 2007. The disclosures of the foregoing applications are incorporated herein by reference.

BACKGROUND OF THE INVENTION

1. Field of the Invention

The present invention relates to a pet leash and more particularly to a no-tangle retractable leash used in connection with simultaneously walking of two pets.

2. Description of the Prior Art

Retractable pet leashes are known in the prior art. For example, U.S. Pat. Nos. 5,762,029, 5,887,550, 6,003,472, 6,024,054 all show a retractable pet leash. However, owners of multiple pets, such as dogs, require the use of multiple retractable leashes, which is very inconvenient.

To solve that problem, multiple pets can be walked while using a one-handle retractable leash, according to U.S. Pat. No. 6,792,893. Additionally, a single handle retractable leash for multiple pets is described in U.S. Pat. No. 6,474,270.

However, such multiple-pet retractable-leash devices are plagued with problematic leash entanglement. Two pets allowed to run, while tethered to leashes, will most certainly entangle, creating a handling problem for the person using the device.

Leash-entanglement prevention devices for non-retractable leashes are known. They are represented in U.S. Pat. Nos. 6,273,029 and 6,626,132. Such devices, when used with retractable leashes, however, do not resolve the entanglement problem of the two-pet retractable-leash devices.

The present inventor's U.S. Pat. No. 7,207,296 discloses an improved pet leash device that combines the use of two retractable leashes in a one-hand-held device where the leashes automatically disentangle. The inventor has further improved the device of U.S. Pat. No. 7,207,296, as disclosed herein.

SUMMARY OF THE INVENTION

The present invention relates to a no-tangle two dog retractable leash device, having a pair of individual leashes for being used to walk two dogs simultaneously. A handle is attached to a housing (or casing), which encloses a bearing wheel. A cowling or extension is formed at the handle to provide a smooth transition between the handle and the housing to avoid possible entanglement of the leashes between the handle and the housing.

The bearing wheel allows the mechanism to spin while the handle is connected to a shaft supported by the bearing to stay fixed, e.g., in a person's hand, as the dogs cross one another's paths while walking. This spinning of the mechanism prevents the two attached retractable leashes from tangling. The retractable leashes provide unmatched flexibility when walking dogs.

The two-pet no-tangle retractable leash device further includes an axle possibly having a rod opening, positioned in this example perpendicular to its axis, and two spools with leashes rotatably mounted on the axle. A proximal end of each leash is attached to its respective spool and a distal end extends through one of two leash openings in a housing. Additionally, each spool has a spool brake and a return spring. A proximal end of each return spring is connected to the spool and a distal end is connected to the axle. When a force is applied, e.g., pulling on the leashes, the spools rotate, thereby unwinding the return springs. When the force is removed, the return springs rewind forcing the spool to rewind the leashes to their original position.

The device further includes a shaft and a brake rod, both having proximal and distal ends. The shaft may be positioned perpendicular to the axle. A proximal end of a brake rod passes through the shaft and its distal end may pass through the rod opening in the axle. A brake which may have a cone shape connected to the distal end of the brake rod and a brake spring is positioned on the brake rod between the brake and the axle. The shaft rotation around the shaft axis is enabled when the brake is not engaged and disabled when the brake is engaged. Furthermore, the spools' rotation around the axle axis is enabled when the brake is not engaged and disabled when the brake is engaged.

The device is enclosed in the housing which supports the axle and the shaft. A front panel of the housing may include an accessory. It also includes a first and a second leash opening, each leash opening having an optional grommet. A handle including a stop notch for operating the brake rod is attached to the proximal end of the shaft.

The handle is attached to the shaft, which is rotatably supported by a bearing attached to the housing that allows the housing to rotate with respect to the handle, thereby preventing tangling of the leashes. Similarly, the brake rotates together with the brake rod, the shaft and the handle, but when engaged, engages and stops the spools and thereby the leashes from spooling out or retracting.

The handle can take any shape. In one embodiment of the device, the shaft may function as the handle. A cowling or extension is formed at the handle to provide a smooth transition between the handle and the housing to avoid possible entanglement of the leashes between the handle and the housing.

A locking device such as a sliding lock may be provided, e.g. on the casing, for one or both of the spools. The locking device may engage a corresponding spool, or axle, for example, to stop retraction of the corresponding leash if desired. In that case entanglement of the non-retracting leash or leashes between the handle and casing might be more likely, but the cowling provided at the handle protects against this entanglement.

Other features and advantages of the device will become apparent from the following description of the device that refers to the accompanying drawings.

BRIEF DESCRIPTION OF THE DRAWINGS

FIGS. 3 and 4 are perspective views of the sides of the housing;

DETAILED DESCRIPTION OF AN EMBODIMENT OF THE INVENTION

Figure 1:
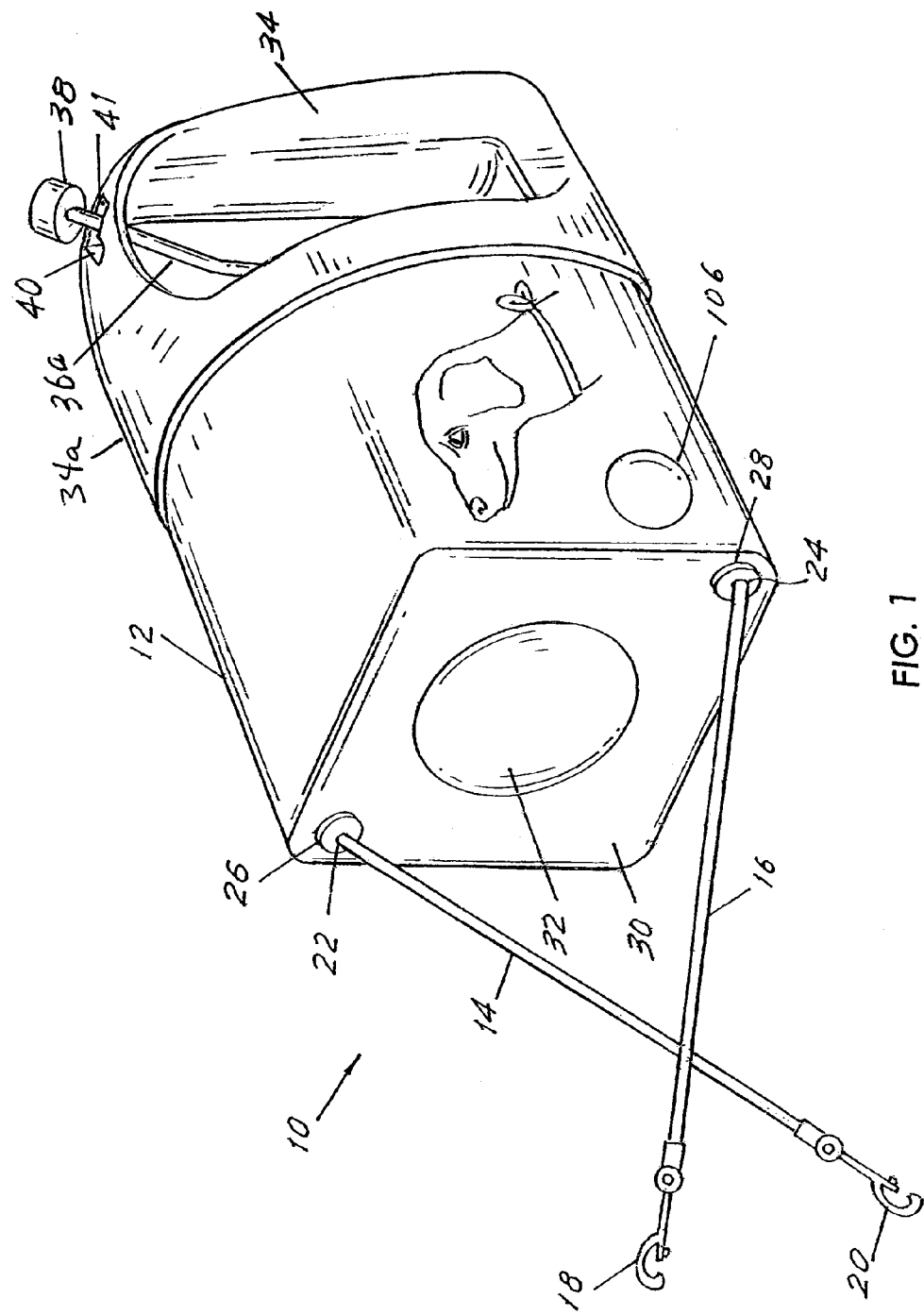
FIG. 1 is a perspective view of a two-pet no-tangle retractable leash of an embodiment of the present invention.

FIG. 1 shows a perspective view of the no-tangle two pet retractable leash device 10. A housing 12 of the device 10 having a front panel 30 that includes a first leash entry opening 22 and a second leash entry opening 24. The leash openings 22 and 24 optionally include a first opening grommet and a second opening grommet 26 and 28. A distal end of a first leash 14 extends through the opening 22 and a distal end of a second leash 16 extends through the second opening 24. Optionally, the leashes may include collar hooks 18 and 20 used to tether the leashes 14, 16 to pet collars.

The front panel 30 may further optionally include an accessory 32. This accessory 32 may be a flashlight, a radio, a global positioning device, a device that measures spooling and retraction of the leashes 14 and 16. The spooling and retraction of the leashes may be measured in order to determine the speed of the leashed pet. The housing further includes a handle 34 that has a brake rod 36 protruding through a rod stop opening 41 that includes a stop notch 40. The brake rod 36 further includes a brake extension opening 86 through which a brake rod extension 36a passes. A brake rod extension 36a may optionally include a push pad 38.

Also shown is a cowling portion 34a. In this embodiment the cowling 34a may be integral with the handle 34 as shown, or merely attached to the handle, or attached intermediate the handle 34 and the housing 12 (not shown). The cowling 34a and the proximal end of the housing 12 have a cylindrical shape in this example. The cowling 34a fits closely around the proximal end of the housing 12 and guards against entanglement of a leash between the handle 34 and the housing 12. Advantageously the cowling 34a is attached to the handle 34 and rotates therewith.

Figure 2:
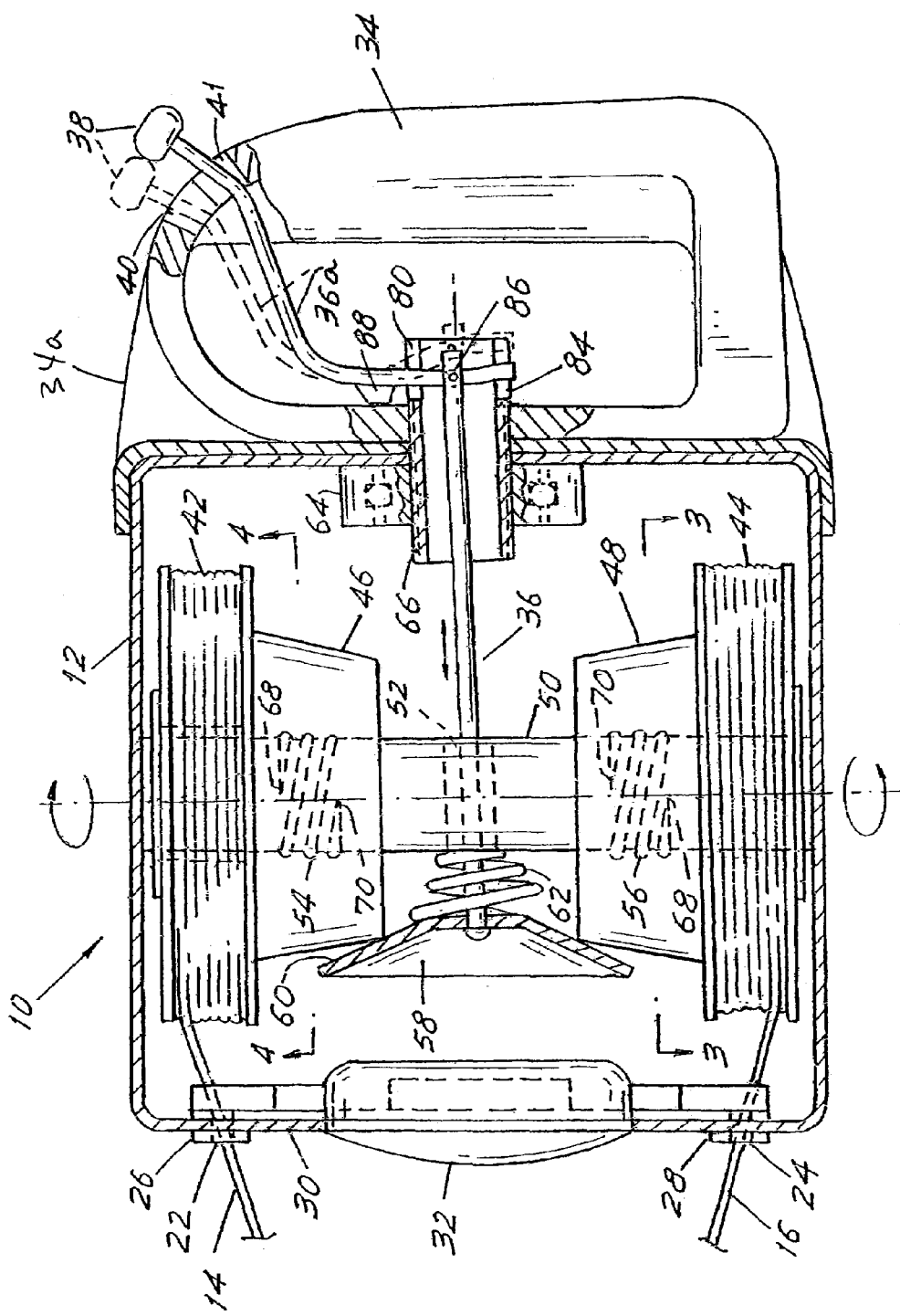
FIG. 2 is a top view of the inside of the housing of the embodiment of FIG. 1.

FIG. 2 shows the no-tangle two pet retractable leash device 10 in cross-section. The leash device 10 includes the housing 12, a first leash spool 42 and a second leash spool 44. The first and second leash spools 42, 44 include first and second spool brakes 46 and 48. The leash spools 42, 44 further include first and second spool return springs 54 and 56.

The housing 12 further includes an axle 50 attached to the housing, which passes through the center of each of the spools 42 and 44. The axle 50 includes a brake rod opening 52.

The first and second spool return springs 54 and 56 include a first return spring end 68 and a second return spring end 70. The second return spring end 70 is fastened to the axle 50 and the first return spring end 68 is fastened to the first or the second spool 42, 44. Leashes 14 and 16 are wrapped around the first leash spool and the second leash spool 42, 44, respectively. The leashes have a proximal end connected to the spool and a distal end protruding through the leash entry openings 22, 24. Each of the leash entry openings 22, 24 may include the opening grommet 26, 28. An optional housing accessory 32, discussed above with reference to FIG. 1, may be fastened to the front panel 30 of the housing 12 of the device 10.

FIG. 2 further shows a brake 58, shaped as a cone-shaped disk in this example, having a pad 60 connected to a rod 36. A bearing 64 is shown connected to the housing 12. A shaft 66 is rotatably supported by the bearing 64. The rod 36 passes through the shaft 66 and the brake rod opening 52 and is attached to the brake 58. A brake spring 62 is positioned on a section of the rod 36 residing between the brake 58 and the axle 50. A height of the brake spring 62 is sufficient to keep the brake 58 in a position a small distance away from the spool brake elements 46 and 48.

In one embodiment, when the push pad 38 is pushed or moved in the direction A parallel to that of the shaft axis, toward the housing, the brake rod extension 36a enters the stop notch 40 of the handle opening 41. As the top portion of the rod extension 36a having the push pad 38 is move forward, its bottom part connected to a brake notch 84 in the shaft 66 pushes against a pivot point 82 at the bottom of a cutout 86 in the shaft 66. This pushing of the rod extension 36a at the pivot point 82 forces the brake rod 36 to move out of the housing 12 thereby forcing the brake cone 58 connected to the brake rod 36 to depress the brake spring 62 and to engage the spool brake elements 46, 48 and through them the spools 42, 44.

When the brake rod extension 36a is not engaged, i.e., it is not held in the rod stop notch 40, the leash spools 42, 44 rotate around the axis of the axle 50 allowing the leash 14, 16 to be spooled out and retracted into the housing 12. Similarly, the shaft 66 and the handle 34 attached to shaft 66 are allowed to rotate around the shaft's axis. The brake rod 36 is held by the rod extension 36a, which extends through the brake extension opening 86 in the rod 36 and rests in a shaft cutout 80. Because the rod extension 36a is attached to the handle 34 through the opening 41, the brake rod 36 and the brake 58 attached to it are also rotating around the shaft's axis. The spring 62 allows this rotation by separating the brake 58 from the spool brake elements 46, 48.

When the brake is engaged, by moving of the brake rod extension 36a in the A direction into the stop notch position 40, the brake pad 60 of the brake 58 engages with spool brake elements 46, 48, thereby preventing spools 42 and 44 from rotating. This stops the movement of the leashes 14, 16. Likewise, the created tension in the brake 58, which is attached to the brake rod 36, immobilizes the brake rod 36. The tension in the brake rod 36 is extended to the rod extension 36a, which extends through the brake extension opening 86 in the rod 36 and rests in the shaft cutout 80. Thus, the rod extension 36a wedged in the shaft cutout 80 prevents the shaft 66 from rotating. Additionally, the handle 34 attached to the shaft 66 is also prevented from rotating within the bearing 64. When the brake is engaged all movement around the axle and the shaft axis stops.

The front panel 30 includes openings 22 and 24 and optional grommets 26 and 28, the accessory 32 and a battery case 76. A back panel 78 is positioned parallel and opposite to the front panel 30 of the housing 12. The back panel 78 includes the bearing 64 for supporting the shaft 66 (not shown) to which the handle 34 having the opening 41 and the stop notch 40 is attached. The brake rod extension 36a (not shown) including the push pad 38 protrudes through the shaft and through the opening 41 in the handle 34 having a stop notch 40.

FIGS. 3 and 4 show a side view of the spools 42 and 44 along the lines 5 and 6 (FIG. 2). FIG. 3 shows the housing 12 that includes the spool 44 holding the leash 16. The leash 16 protruding out of the opening 24. The opening 24 may include a grommet 28. The leash 16 being positioned within the spool 44 on top of the spool floor 45. An axle 50 is positioned through the center of the spool 44. The second spool return spring 56 is wound around the axle 50. The first return spring end 68 of the spring 56 is attached to the spool 44. The second return spring end 70 is attached to the axle 50.

FIG. 4 shows a housing 12 including a spool 42 having a floor 43 upon which the leash 14 is wrapped. The leash 14 protrudes out of the housing 12 through the opening 22. The opening 22 may have an optional grommet 26. The spring 54 is wound around the axle 50. The first return spring end 68 is attached to the spool 42 and the second return end 70 of the spring 54 is attached to the axle 50.

Both FIGS. 3 and 4 show the proximal end 74 and 72 of the leashes 14 and 16 being attached to the spool floor 43 and 45 of their respective leash spools 42 and 44.

Also shown are a pair of sliding locks 100, 110 positioned at respective sides of the housing 12 adjacent the spools 42, 44. (Omitted for clarity in FIG. 2.) The locks 100 and 110 are movable radially with respect to the spools and engage projections 102,112 formed on the spools 42, 44. The locks 100, 102 are guided by guides 104, 114. They are moved along their radial path by exterior buttons (see 106 in FIG. 1) connected to the buttons by screws 108, 118. The screws pass through respective radially-arranged slots (not shown) formed in the housing 12. Of course the configuration of the locking devices and their mode of interaction with the spools is completely optional.

Figure 6:
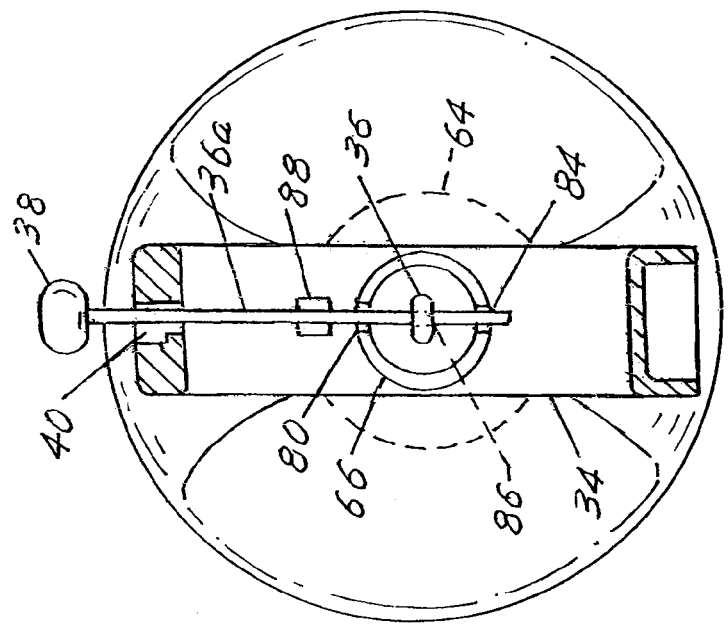
FIG. 6 is a perspective view of the top of the shaft.
Figure 5:
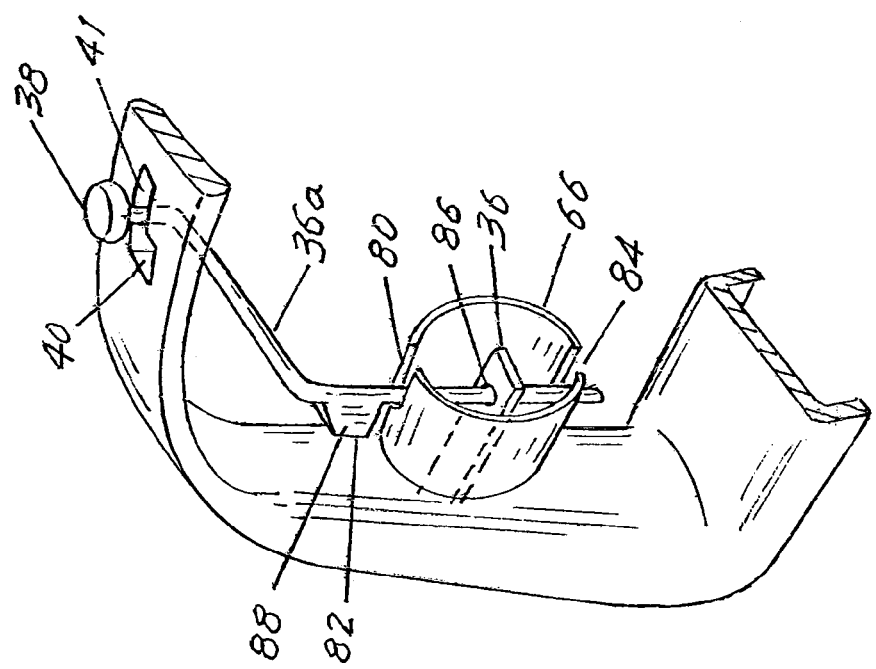
FIG. 5 is a close-up view of the connection of a brake rod extension to a brake rod and a shaft.

FIGS. 5 and 6 show the interconnection of the brake rod 36 and the brake rod extension 36a through the brake extension opening 86. One side of the brake rod extension 36a rests in the brake notch 84 of the shaft 66 and the other side rests in the brake cutout 80 of the shaft 66. The brake rod extension 36a includes an elbow 88. Thus, when the brake rod extension 36a is pushed in the A direction the elbow 88 is pressed against the pivot point 82 on the handle 34, thereby lifting the brake rod 36 out of the shaft 66.

FIG. 6 further shows the notch 40 in the opening 41. After the brake rod extension 36a is pushed in the A direction, it may be secured in the notch 40 thereby keeping the pressure by the elbow 88 on the handle 34 at the pivot point 82. This maintains the lifted position of the brake rod 36 and, as described above, all movement of parts of the device 10 is stopped.

Although particular embodiments have been described, many other variations and modifications and other uses will become apparent to those skilled in the art. Therefore, the present invention is not limited by the specific disclosure herein.

What is claimed is:

1. A one-hand operable two-pet no-tangle retractable leash apparatus comprising:
    a housing;
    an axle and a shaft mounted on the housing;
    first and second spools mounted on the axle, each spool having a spool brake element and a return spring for retracting a leash; and
    a brake attached to a brake rod, in a position engageable with said spool brake elements, the brake rod passing through the shaft;
    the shaft being rotatably mounted on the housing; a handle outside the housing mounted on and rotatable with the shaft; and
    a cowling portion at said handle, covering an area between said handle and said housing and blocking entry of a leash into said area.

2. The apparatus of claim 1, wherein a rotation of the shaft around an axis of the shaft is enabled when the brake is not engaged with the spool brake elements and disabled when the brake is engaged.

3. The apparatus of claim 1, wherein a rotation of the spools around the axle axis is enabled when the brake is not engaged with the spool brake elements and disabled when the brake is engaged.

4. The apparatus of claim 1, further comprising the housing including a front panel having a first leash opening and a second leash opening for spooling and retracting the corresponding leash.

5. The apparatus of claim 4, wherein each leash opening includes a grommet for supporting the leash.

6. The apparatus of claim 4, further comprising a locking device at said housing, engageable with a respective one of said spools for stopping rotation of said spool.

7. The apparatus of claim 4, wherein the first spool includes a retractable leash being spooled through the first opening and the second spool includes a retractable leash being spooled through the second opening.

8. The apparatus of claim 7, wherein each leash has a proximal end attached to the spool and a distal end extending through the first and second leash opening in a front panel.

9. The apparatus of claim 8, wherein the spools and the spool brake elements are rotatably mounted on the axle, the return springs being in a first position when the leash is fully wound on each of the spools.

10. The apparatus of claim 9, wherein proximal ends of the return springs are fixably connected to the spools and distal ends of the return springs fixably connected to the axle,
    the return spring is torqued from its first position when a force is exerted to pull the leash out of the housing thereby rotating the spools,
    the return spring returns to its first position when the force is terminated, thus rewinding the leash.

11. The apparatus of claim 1, wherein the first and the second spools rotate independently of each other.

12. The apparatus of claim 1, further comprising a locking device on said housing, engageable with a respective one of said spools for stopping rotation of said spool.

13. The device of claim 1, wherein said cowling portion is mounted on and rotatable with said handle.

14. A two-pet no-tangle retractable leash device comprising:
    an axle having a rod opening;
    a first spool including a first leash and a second spool including a second leash rotatably mounted on the axle,
    each leash having a proximal end attached to the spool and a distal end extending through one of two leash openings,
    each spool having a spool brake element and a return spring, a proximal end of the return spring being connected to the spool and a distal end of the return spring being connected to the axle, wherein when a force is applied to pull the leashes, the spools rotate thereby unwinding the return springs, and when the force is removed, the return springs rewind forcing the spool to rewind the leash to its original position;
    a shaft having a proximal end and a distal end;
    a brake rod having a distal end passing through the rod opening and the proximal end passing through the shaft;
    a brake connected to the distal end of the brake rod, in a position engageable with said spool brake elements; and
    a brake spring positioned on the brake rod between the brake and the axle, wherein the shaft rotation around the shaft axis and the spools' rotation around the axle axis is enabled when the brake is not engaged and disabled when the brake is engaged.

15. The device of claim 14, further comprising:
    a housing for supporting the axle and the shaft;
    a front panel including a first and second leash opening;
    a handle attached to the proximal end of the shaft, the handle including a device for operating the brake rod; and
    a bearing attached to the housing for rotatably supporting the shaft.

16. The device of claim 15, further comprising a locking device on said housing, engageable with a respective one of said spools for stopping rotation of said spool.

17. The device of claim 14, further comprising a housing, and a handle attached to the shaft, and a cowling portion at said handle for covering an area between said handle and said housing.

18. The device of claim 17, further comprising a locking device on said housing, engageable with a respective one of said spools for stopping rotation of said spool.

19. The device of claim 17, wherein said cowling portion is mounted on and rotatable with said handle.

20. A one-hand operable two-pet no-tangle retractable leash apparatus comprising:
   an axle and a shaft;
   first and second spools mounted on the axle, each spool having a spool brake element and a return spring for retracting a leash; and
   a brake attached to a brake rod, in a position engageable with said spool brake elements, the brake rod passing through the shaft;
   a housing including a front panel having a first leash opening and a second leash opening for spooling and retracting the corresponding leash; and
   a bearing for rotatably supporting the shaft, the bearing being affixed to the housing opposite the front panel.

21. A one-hand operable two-pet no-tangle retractable leash apparatus comprising:
   an axle and a shaft;
   first and second spools mounted on the axle, each spool having a spool brake element and a return spring for retracting a leash; and
   a brake attached to a brake rod, in a position engageable with said spool brake elements, the brake rod passing through the shaft;
   wherein a brake spring is positioned around the brake rod between the brake and the axle.

* * * * *